(12) United States Patent
Kang et al.

(10) Patent No.: US 11,566,668 B2
(45) Date of Patent: Jan. 31, 2023

(54) ROTATION INDUCTION DEVICE FOR VEHICLE

(71) Applicant: HYUNDAI MOBIS CO., LTD., Seoul (KR)

(72) Inventors: Jun Mo Kang, Yongin-si (KR); Byung Joon Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/410,285

(22) Filed: Aug. 24, 2021

(65) Prior Publication Data

US 2022/0065297 A1 Mar. 3, 2022

(30) Foreign Application Priority Data

Aug. 25, 2020 (KR) .................. 10-2020-0107109

(51) Int. Cl.
*B60B 15/06* (2006.01)
*F16C 17/04* (2006.01)
*F16C 33/74* (2006.01)
*B60G 15/06* (2006.01)
*F16C 33/20* (2006.01)

(52) U.S. Cl.
CPC ............ *F16C 33/74* (2013.01); *B60G 15/068* (2013.01); *F16C 17/04* (2013.01); *B60G 2204/418* (2013.01); *F16C 33/20* (2013.01); *F16C 2326/05* (2013.01)

(58) Field of Classification Search
CPC ........ F16C 17/04; F16C 17/18; F16C 33/102; F16C 33/20; F16C 33/74; F16C 2326/05; B60G 15/067; B60G 15/068; B60G 2204/418; B60G 2206/71

See application file for complete search history.

(56) References Cited

U.S. PATENT DOCUMENTS

| 11,313,412 B2* | 4/2022 | Yamada ............... F16J 15/3232 |
| 2008/0310780 A1* | 12/2008 | Watai ..................... F16C 33/74 384/420 |
| 2014/0270609 A1* | 9/2014 | Morishige ............... F16C 33/80 384/144 |
| 2018/0370317 A1* | 12/2018 | Takahashi ................ B60G 7/02 |

FOREIGN PATENT DOCUMENTS

| JP | H04105218 U | * | 9/1992 |
| KR | 20110035223 A | * | 4/2011 |
| KR | 10-2020-0033219 A | | 3/2020 |

OTHER PUBLICATIONS

Machine Translation of JP-H04105218-U (Year: 1992).*

* cited by examiner

*Primary Examiner* — Alan B Waits
(74) *Attorney, Agent, or Firm* — NSIP Law

(57) ABSTRACT

A rotation induction device for a vehicle includes: an upper case having a piston rod disposed therethrough; a lower case disposed adjacent to the upper case and having the piston rod disposed therethrough; a center plate disposed between the upper case and the lower case such that the piston rod passes through the center plate, to induce rotation of one or both of the upper case and the lower case; and a position guide part formed on one or both of the upper case and the lower case, to guide a position of the center plate.

14 Claims, 9 Drawing Sheets

ROTATION INDUCTION DEVICE FOR VEHICLE

CROSS-REFERENCE TO RELATED APPLICATION

This application claims priority from and the benefit of Korean Patent Application No. 10-2020-0107109, filed on Aug. 25, 2020, which is hereby incorporated by reference for all purposes as if set forth herein.

BACKGROUND

Field

Exemplary embodiments of the present disclosure relate to a rotation induction device for a vehicle, and more particularly, to a rotation induction device for a vehicle, which includes a bearing that is used for a suspension of a vehicle and made of synthetic resin, in order to improve operability.

Discussion of the Background

In general, a strut-type suspension is used for a front wheel of a four-wheel vehicle having a structure in which a coil spring is combined with a strut assembly having a hydraulic shock absorber embedded in an outer shell integrated with a main shaft. The strut-type suspension is divided into a suspension in which a piston rod of the strut assembly is rotated when the strut assembly is rotated with the coil spring during a steering operation, and a suspension in which the piston rod of the strut assembly is not rotated when the strut assembly is rotated with the coil spring during the steering operation. In order to smoothly allow the rotation of the strut assembly in any strut-type suspension, a bearing is used between a mounting member of a vehicle body and an upper spring support sheet of the coil spring.

As the bearing, a rolling bearing using a ball or needle is used. However, the rolling bearing has a problem in that fatigue fraction may occur in the ball or needle due to a vibration load or slight rolling, which makes it difficult to maintain a smooth steering operation. Therefore, there is a need for a device capable of solving the problem.

The related art of the present disclosure is disclosed in Korean Patent Application Publication No. 2020-0033219 published on Mar. 27, 2020 and entitled "Strut Bearing Assembly for Suspension".

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a rotation induction device for a vehicle includes: an upper case having a piston rod disposed therethrough; a lower case disposed adjacent to the upper case and having the piston rod disposed therethrough; a center plate disposed between the upper case and the lower case such that the piston rod passes through the center plate, and configured to induce rotation of one or both of the upper case and the lower case; and a position guide part formed on one or both of the upper case and the lower case, and configured to guide a position of the center plate.

The upper case may include: an upper cover part configured to cover a first surface of the center plate, and the upper cover part may define an upper hole through which the piston rod passes; and an upper blocking part disposed at a periphery of the upper cover part, and configured to block an inflow of foreign matters.

The lower case may include: a lower cover part configured to cover a second surface of the center plate, and the lower cover part may define a lower hole through which the piston rod passes; and a lower blocking part disposed at a periphery of the lower cover part, and configured to block an inflow of foreign matters.

The upper blocking part may include: an upper blocking hook part extended toward the lower case along the periphery of the upper cover part; and an upper blocking protrusion part protruding from the upper cover part toward the lower case, and disposed to face the upper blocking hook part across a space.

The lower blocking part may include: a lower blocking locking part disposed along the periphery of the lower cover part, and defining a groove into which the upper blocking hook part is configured to be locked and fixed; a lower blocking dropping part extended from the periphery of the lower cover part toward an end of the upper blocking hook part so as to drop foreign matters; and a lower blocking protrusion part protruding from the periphery of the lower cover part toward the upper case, and disposed in the space between the upper blocking hook part and the upper blocking protrusion part.

The upper blocking hook part may include an upper inclined surface formed thereon, and the lower blocking dropping part may include a lower inclined surface corresponding to the upper inclined surface.

The upper inclined surface may be disposed on an outer end of the upper blocking hook part.

The lower blocking protrusion part may overlap with the upper blocking protrusion part.

The position guide part may include: an upper guide part protruding from the upper case toward the lower case to support an inner circumferential surface of the center plate; and a lower guide part protruding from the lower case toward the upper case to support an outer circumferential surface of the center plate.

The upper guide part and the lower guide part may each have a circular belt shape.

One or more of the upper case, the lower case, and the center plate may be composed of a synthetic resin material.

The rotation induction device may include: a first lubricant retention part protruding from the lower case toward the upper case and covering an inner peripheral surface of the center plate to prevent lubricant from overflowing to an inside of the center plate; and a second lubricant retention part protruding from the lower case toward the upper case and covering an outer peripheral surface of the center plate to prevent lubricant from overflowing to the inside of the center plate.

The rotation induction device may include a friction restraint part formed on one or both of the upper case and the lower case, and configured to restrain friction with the center plate.

Other features and aspects will be apparent from the following detailed description, the drawings, and the claims.

DETAILED DESCRIPTION OF THE ILLUSTRATED EMBODIMENTS

Hereinafter, a rotation induction device for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
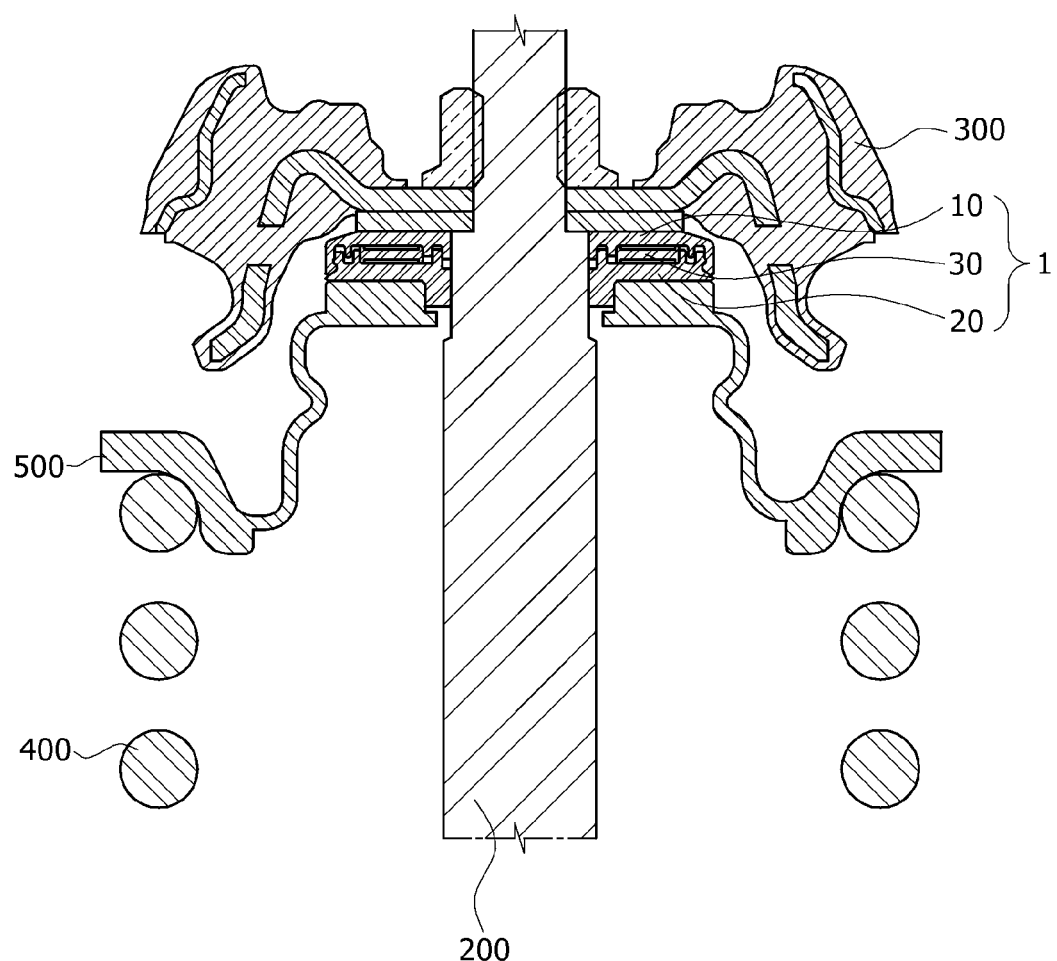
FIG. 1 is a diagram schematically illustrating that a rotation induction device for a vehicle in accordance with an embodiment of the present disclosure is installed.
Figure 2:
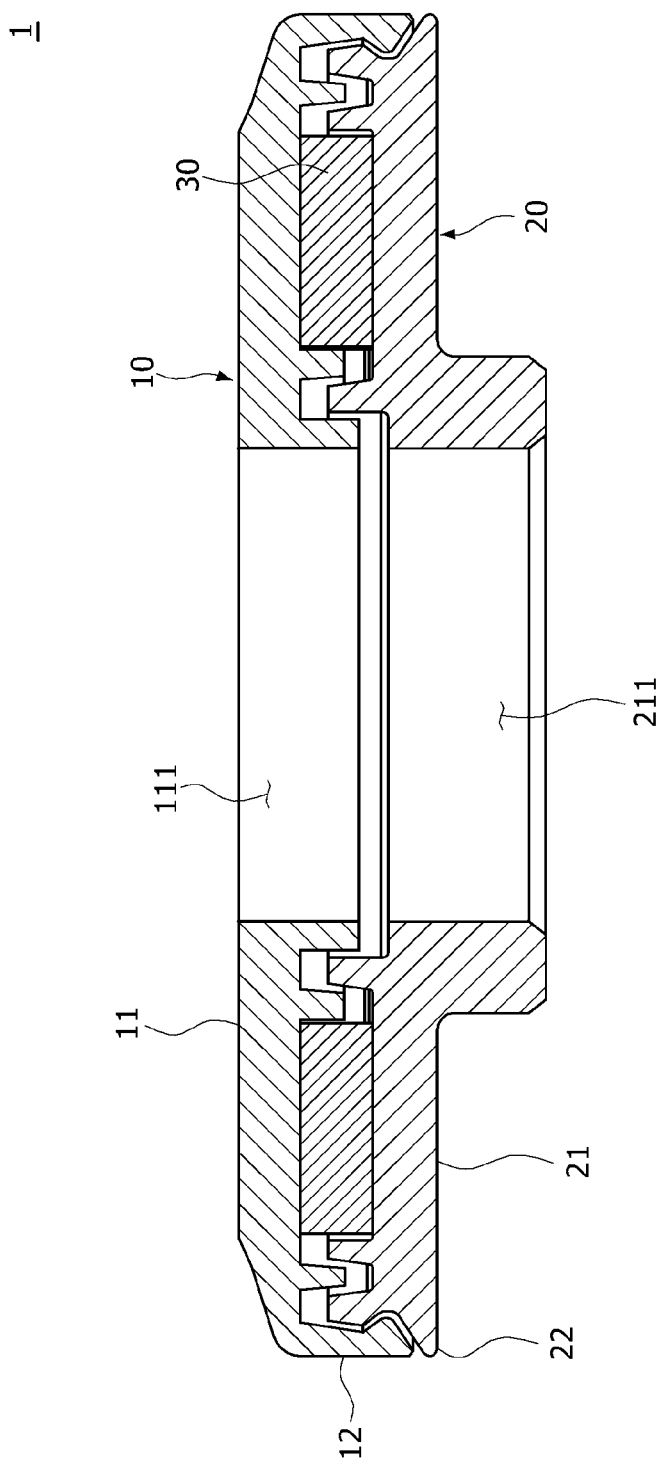
FIG. 2 is a diagram schematically illustrating the rotation induction device for a vehicle in accordance with the embodiment of the present disclosure.

FIG. 1 is a diagram schematically illustrating that a rotation induction device for a vehicle in accordance with an embodiment of the present disclosure is installed, and FIG. 2 is a diagram schematically illustrating the rotation induction device for a vehicle in accordance with the embodiment of the present disclosure. Referring to FIGS. 1 and 2, the rotation induction device 1 for a vehicle in accordance with the embodiment of the present disclosure includes an upper case 10, a lower case 20 and a center plate 30.

The upper case 10 is made of a synthetic resin material, and has a piston rod 200 disposed therethrough. For example, the upper case 10 may have a hole formed in the center thereof such that a piston rod 200 passes through the hole, and an insulator 300 may be disposed above the upper case 10.

The lower case 20 is made of a synthetic resin material, and disposed under the upper case 10 such that the piston rod 200 passes through the lower case 20. For example, the lower case 20 may have a hole formed in the center thereof such that the piston rod 200 passes through the hole, and a sheet 500 to support the top of a spring 400 may be disposed under the lower case 10.

The center plate 30 is made of a synthetic resin material, and disposed between the upper case 10 and the lower case 20 such that the piston rod 200 passes through the center plate 30. Such a center plate 30 induces the rotation of any one of the upper and lower cases 10 and 20. For example, the center plate 30 may retain the state in which the top surface thereof is contacted with the upper case 10 and the bottom surface thereof is contacted with the lower case 20. The center plate 30 may induce the contact surfaces to slide, thereby inducing the rotation of the lower case 20.

Figure 3:
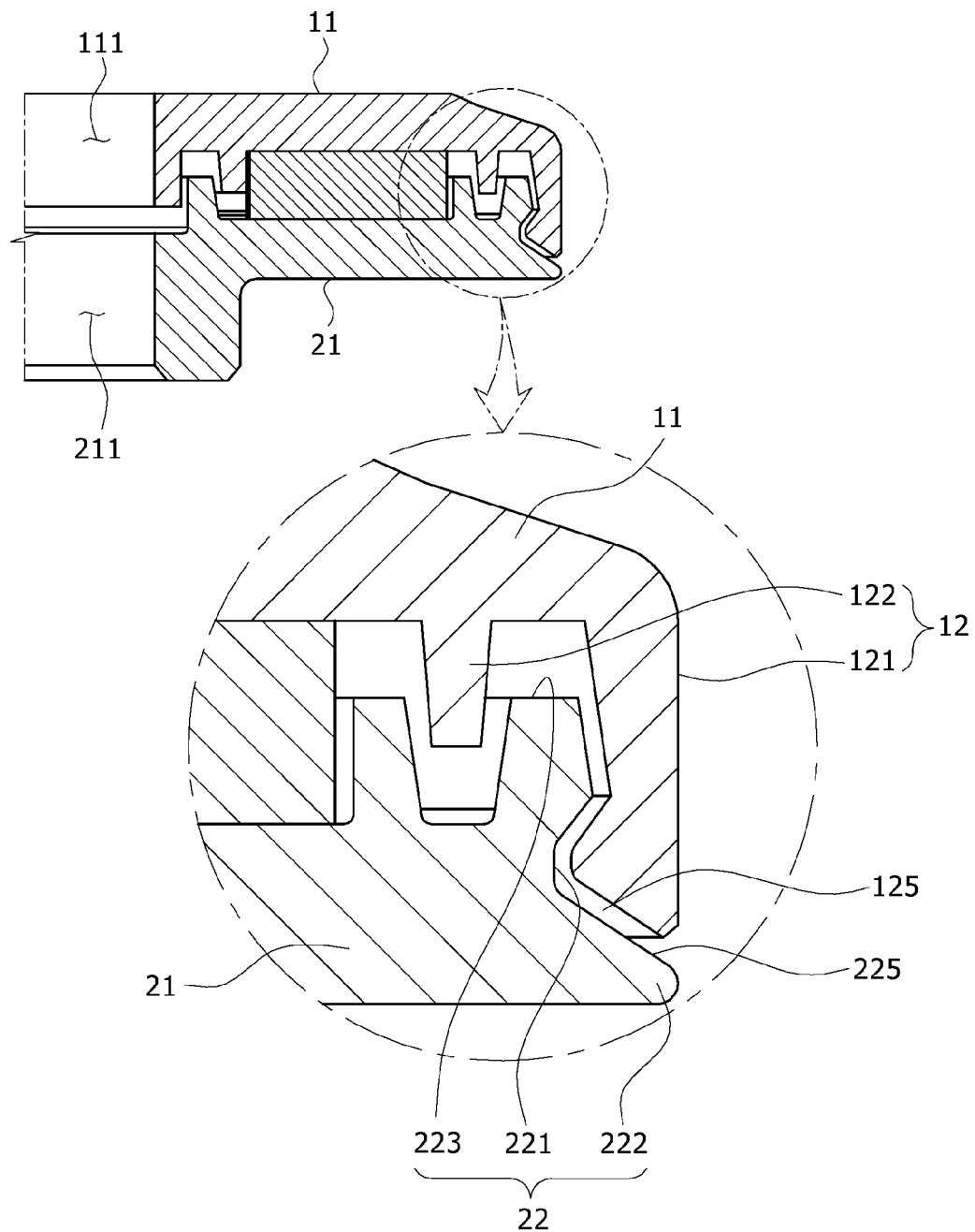
FIG. 3 is a diagram schematically illustrating an upper case and a lower case in accordance with an embodiment of the present disclosure.

FIG. 3 is a diagram schematically illustrating the upper case and the lower case in accordance with an embodiment of the present disclosure. Referring to FIGS. 2 and 3, the upper case 10 includes an upper cover part 11 and an upper blocking part 12, and the lower case 20 includes a lower cover part 21 and a lower blocking part 22.

The upper cover part 11 has an upper hole 111 formed in the center thereof, such that the piston rod 200 passes through the upper hole 111. The upper cover part 11 covers the top of the center plate 30. For example, the upper cover part 11 may be formed in a ring shape through which the piston rod 200 can pass.

The upper blocking part 12 is formed at the edge of the upper cover part 11, and serves to block the inflow of foreign matters. For example, the upper blocking part 12 may be integrated with the upper cover part 11, and induce foreign matters to fall down while fluid introduced from the outside is moved upward and downward.

The lower cover part 21 has a lower hole 211 formed in the center thereof, such that the piston rod 200 passes through the lower cover part 21. The lower cover part 21 covers the bottom of the center plate 30. For example, the lower cover part 21 may be formed in a ring shape through which the piston rod 200 passes.

The lower blocking part 22 is formed at the edge of the lower cover part 21, and serves to block the inflow of foreign matters. For example, the lower blocking part 22 may be integrated with the lower cover part 21, and serve to induce the coupling with the upper blocking part 12. Furthermore, the lower blocking part 22 may be spaced apart from the upper blocking part 12, and thus drop foreign matters while guiding fluid.

More specifically, the upper blocking part 12 includes an upper blocking hook part 121 and an upper blocking protrusion part 122.

The upper blocking hook part 121 is extended downward from the edge of the upper cover part 11. For example, the upper blocking hook part 121 may have a lower end formed in a hook shape so as to be hooked to the lower case 20.

The upper blocking protrusion part 122 protrudes downward from the upper cover part 11 so as to face the upper blocking hook part 121. For example, the upper blocking protrusion part 122 may have an outer diameter smaller than that of the upper blocking hook part 121.

The lower blocking part 22 includes a lower blocking locking part 221, a lower blocking dropping part 222 and a lower blocking protrusion part 223.

The lower blocking locking part 221 is formed at the edge of the lower cover part 21, and has a groove to which the upper blocking hook part 121 is hooked and fixed. For example, the lower blocking locking part 221 may be formed at the outer circumferential surface of the lower case 20, and the upper blocking hook part 121 may be inserted into the lower blocking locking part 221 and then hooked and fixed thereto. Thus, fluid introduced between the upper blocking hook part 121 and the lower blocking locking part 221 may flow backward due to the shapes of the upper blocking hook part 121 and the lower blocking locking part 221, which makes it possible to suppress the inflow of foreign matters.

The lower blocking dropping part 222 is extended from the edge of the lower cover part 21 toward the bottom of the upper blocking hook part 121, in order to drop foreign matters. For example, the lower blocking dropping part 222 may be extended from the outer lower end of the lower cover part 21, and the upper blocking hook part 121 may be disposed above the lower blocking dropping part 222.

At this time, the upper blocking hook part 121 has an upper inclined surface 125 formed thereon, and the lower blocking dropping part 222 has a lower inclined surface 225 formed to face the upper inclined surface 125. The space between the upper inclined surface 125 and the lower inclined surface 225 may be so narrow as to suppress the inflow of foreign matters into the lower blocking locking part 221. Since the upper inclined surface 125 is formed on the outer lower end of the upper blocking hook part 121, foreign matters contained in the air introduced between the upper blocking hook part 121 and the lower blocking dropping part 222 may flow downward so as to be discharged to the outside.

The lower blocking protrusion part 223 protrudes upward from the edge of the lower cover part 21 so as to be disposed between the upper blocking hook part 121 and the upper blocking protrusion part 122. For example, the lower blocking protrusion part 223 may be extended upward from the top surface of the edge of the lower cover part 21. The top of the lower blocking protrusion part 223 may be located at a higher level than the bottom of the upper blocking protrusion part 122. Therefore, the movement of fluid having passed through the lower blocking protrusion part 223 may be restricted by the upper blocking protrusion part 122, such that foreign matters are dropped.

Therefore, the inflow of foreign matters between the upper blocking part 12 and the lower blocking part 22 may be suppressed, and the foreign matters may be rapidly dropped through the upper inclined surface 125 and the lower inclined surface 225, which makes it possible to prevent rotational friction or damage caused by the accumulation of foreign matters. Furthermore, although fine foreign matters pass through the space between the upper blocking hook part 121 and the lower blocking locking part 221, the foreign matters may be caught by the upper blocking protrusion part 122 and dropped down to the top of the lower cover part 21. At this time, when the pair of lower blocking protrusion parts 223 are formed so that the upper blocking protrusion part 122 is disposed between the lower blocking protrusion parts 223, it is possible to prevent an increase in rotational friction and part damage caused by the inflow of foreign matters into the center plate 30.

Figure 4:
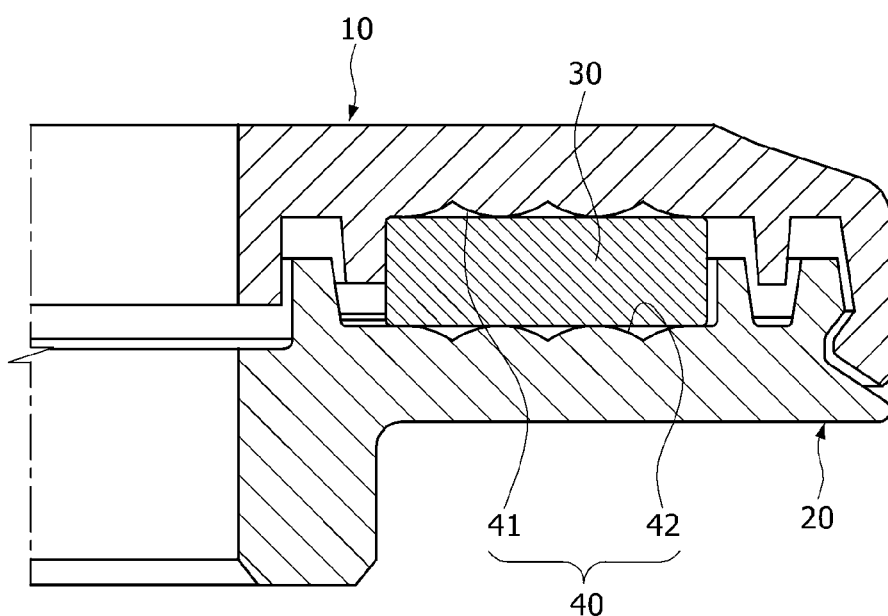
FIG. 4 is a diagram schematically illustrating a friction restraint part in accordance with an embodiment of the present disclosure.

FIG. 4 is a diagram schematically illustrating a friction restraint part in accordance with an embodiment of the present disclosure. Referring to FIG. 4, the rotation induction device 1 for a vehicle in accordance with the embodiment of the present disclosure may further include a friction restraint part 40. The friction restraint part 40 is formed on any one or more of the upper and lower cases 10 and 20, and serves to restrain friction with the center plate 30.

More specifically, the friction restraint part 40 includes an upper restraint part 41 and a lower restraint part 42.

The upper restraint part 41 is formed on the upper case 10, and brought into line contact with the center plate 30. For example, the upper restraint part 41 may be brought into line contact with the top surface of the center plate 30 so as to reduce frictional resistance.

The lower restraint part 42 is formed on the lower case 20, and brought into line contact with the center plate 30. For example, the lower restraint part 42 may be brought into line contact with the bottom surface of the center plate 30 so as to reduce frictional resistance.

The upper restraint part 41 and the lower restraint part 42 each have cycloid surfaces. When the upper and lower restraint parts 41 and 42 each have the cycloid surfaces, stress concentrated by a vertical load may be distributed. The space formed between the cycloid surfaces may have a lubricant stored therein. That is, the connection point between the adjacent cycloid surfaces may correspond to the bottoms of the cycloid surfaces, such that a recess is formed therebetween, and a lubricant such as grease may be stored in such a recess.

Figure 5:
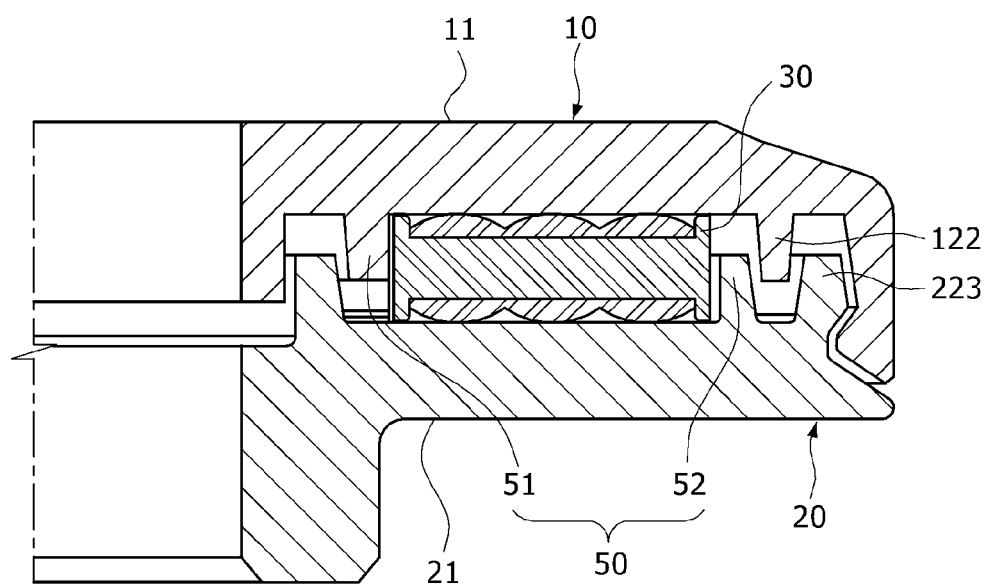
FIG. 5 is a diagram schematically illustrating a position guide part in accordance with an embodiment of the present disclosure.

FIG. 5 is a diagram schematically illustrating a position guide part in accordance with an embodiment of the present disclosure. Referring to FIG. 5, the rotation induction device 1 for a vehicle in accordance with the embodiment of the present disclosure may further include a position guide part 50. The position guide part 50 is formed on any one or more of the upper and lower cases 10 and 20, and serves to guide the position of the center plate 30.

More specifically, the position guide part 50 includes an upper guide part 51 and a lower guide part 52.

The upper guide part 51 protrudes downward from the upper case 10 and supports the inner circumferential surface of the center plate 30. For example, the upper guide part 51 may protrude downward from the bottom surface of the upper cover part 11, have a circular belt shape, and be disposed to face the upper blocking protrusion part 122.

The lower guide part 52 protrudes upward from the lower case 20 and supports the outer circumferential surface of the center plate 30. For example, the lower guide part 52 may protrude upward from the top surface of the lower cover part 21, have a circular belt shape, and be disposed to face the lower blocking protrusion part 223. At this time, the upper blocking protrusion part 122 may be disposed between the lower blocking protrusion part 223 and the lower guide part 52.

Figure 6:
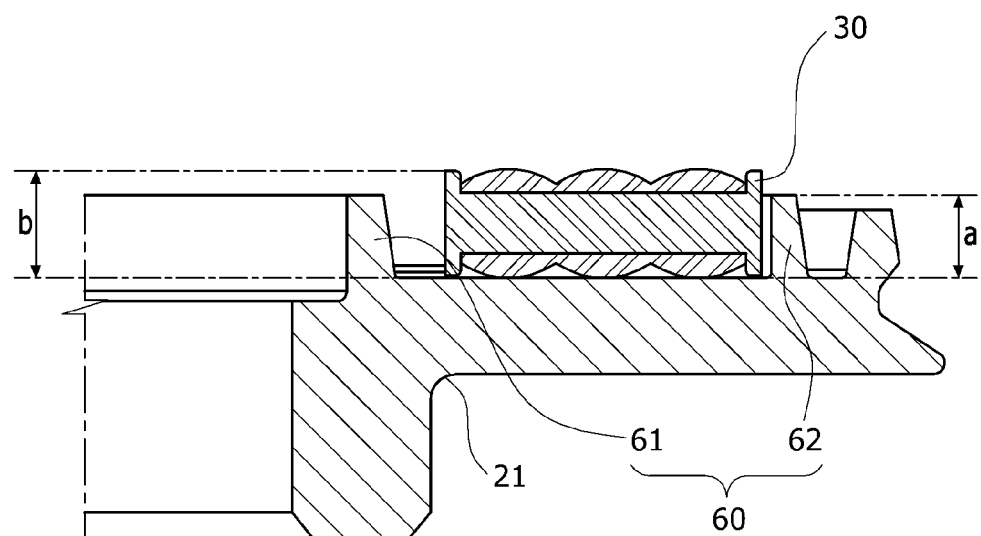
FIG. 6 is a diagram schematically illustrating a lubricant retention part in accordance with an embodiment of the present disclosure.

FIG. 6 is a diagram schematically illustrating a lubricant retention part in accordance with an embodiment of the present disclosure. Referring to FIG. 6, the rotation induction device 1 for a vehicle in accordance with the embodiment of the present disclosure may further include a lubricant retention part 60. The lubricant retention part 60 may be formed on the lower case 20 so as to form a barrier wall for storing a lubricant.

More specifically, the lubricant retention part 60 includes a first lubricant retention part 61 and a second lubricant retention part 62.

The first lubricant retention part 61 protrudes upward from the lower case 20 and covers the inner circumferential surface of the center plate 30. For example, the first lubricant retention part 61 may be extended upward from the top surface of the lower cover part 21 so as to directly support the inner circumferential surface of the center plate 30, or disposed adjacent to the upper guide part 51 so as to prevent a lubricant from overflowing to the inside of the center plate 30.

The second lubricant retention part 62 protrudes upward from the lower case 20 and covers the outer circumferential surface of the center plate 30. For example, the second lubricant retention part 62 may be extended upward from the top surface of the lower cover part 21, directly support the outer circumferential surface of the center plate 30, and prevent a lubricant from overflowing to the outside of the center plate 30. The second lubricant retention part 62 may be separately formed or replaced with the lower guide part 52.

At this time, the height (a) of the lubricant retention part 60 may be set in the range of 50% to 60% of the height (b)

of the center plate 30. That is, when the first and second lubricant retention parts 61 and 62 have the same height, the height (a) of the lubricant retention part 60 may be defined as expressed by Equation 1 below.

$$0.5b \leq a \leq 0.9b \qquad \text{[Equation 1]}$$

Through the regulation of the ratio of the height of the lubricant retention part 60, the lower case 20 may serve as a lubricant pocket of the center plate 30, and the lubricant retention part 60 may serve as a barrier wall for preventing a lubricant leak, which makes it possible to maximize the lubrication performance of the lubricant and to reduce torque.

Figure 7:
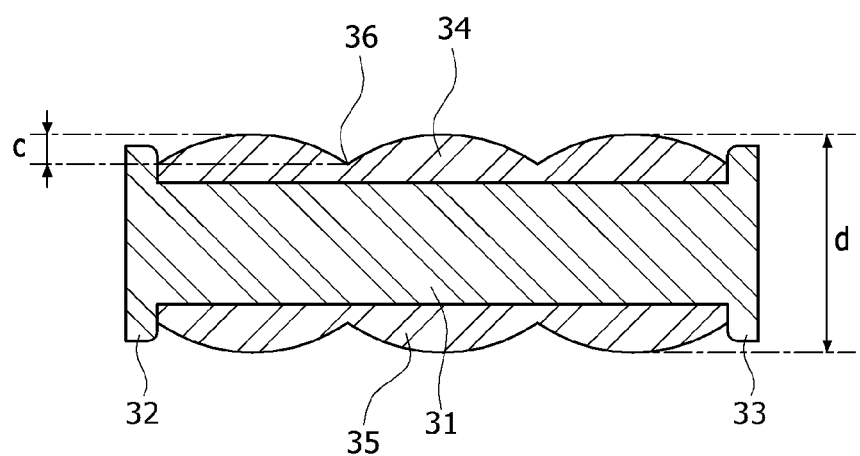
FIG. 7 is a diagram schematically illustrating a center plate in accordance with an embodiment of the present disclosure.

FIG. 7 is a diagram schematically illustrating the center plate in accordance with the embodiment of the present disclosure. Referring to FIG. 7, the center plate 30 in accordance with the embodiment of the present disclosure is brought into line contact with the upper case 10 and the lower case 20, in order to induce rotation.

More specifically, the center plate 30 includes a center disk part 31, a center inner circumferential part 32, a center outer circumferential part 33, a center upper curved part 34 and a center lower curved part 35.

The center disk part 31 is disposed between the upper cover part 11 and the lower cover part 21. For example, the center disk part 31 may be formed in a disk shape with a hole formed in the center thereof. The center disk part 31 may be disposed between the upper guide part 51 and the lower guide part 52.

The center inner circumferential part 32 is formed on the inner circumferential surface of the center disk part 31. For example, the center inner circumferential part 32 may be designed in such a manner that the top thereof is located at a higher level than the top surface of the center disk part 31 and the bottom thereof is located at a lower level than the bottom surface of the center disk part 31. The center inner circumferential part 32 may be supported by the upper guide part 51 such that the position of the center inner circumferential part 32 is maintained.

The center outer circumferential part 33 is formed on the outer circumferential surface of the center disk part 31. For example, the center outer circumferential part 33 may be designed in such a manner that the top thereof is located at a higher level than the top surface of the center disk part 31, and the bottom thereof is located at a lower level than the bottom surface of the center disk part 31. The center outer circumferential part 33 and the center inner circumferential part 32 may correspond to each other. The center outer circumferential part 33 and the center inner circumferential part 32 may be supported by the lower guide part 52 such that the positions thereof are maintained.

The center upper curved part 34 is formed at the top of the center disk part 31, and brought into line contact with the upper case 10. For example, the center upper curved part 34 may have a plurality of curved surfaces, each of which is designed so that the top thereof is located at a higher level than the center inner circumferential part 32 and the center outer circumferential part 33. Thus, the center upper curved part 34 may be brought into line contact with the upper cover part 11.

The center lower curved part 35 is formed at the bottom of the center disk part 31, and brought into line contact with the lower case 20. For example, the center lower curved part 35 may have a plurality of curved surfaces, each of which is designed so that the bottom thereof is located at a lower level than the center inner circumferential part 32 and the center outer circumferential part 33. Thus, the center lower curved part 35 may be brought into line contact with the lower cover part 21.

At this time, the center upper curved part 34 and the center lower curved part 35 each have one or more cycloid surfaces. When the center upper and lower curved parts 34 and 35 each have the cycloid surfaces, stress concentrated by a vertical load may be distributed.

A curved storage part 36 formed between the cycloid surfaces may store a lubricant therein. That is, the connection point between the adjacent cycloid surfaces may correspond to the bottoms of the cycloid surfaces, such that a recess is formed therebetween, and a lubricant such as grease is stored in such a recess.

At this time, the height (c) of the cycloid surface from bottom to top may be set in the range of 10% to 50% of the height (d) of the center plate 30. The height (d) of the center plate 30 may indicate the distance between the top of the center upper curved part 34 and the bottom of the center lower curved part 35, and the height (c) of the center upper curved part 34 or the center lower curved part 35 from bottom to top may be defined as expressed by Equation 2 below.

$$0.1d \leq c \leq 0.5d \qquad \text{[Equation 2]}$$

Through the ratio regulation of the heights of the center upper and lower curved parts 34 and 35 from bottom to top, two or more center upper curved parts 34 and two or more center lower curved parts 35 may be formed on the center disk part 31, and the plurality of curved storage parts 36 formed as grooves at the intersections between the respective curved surfaces may be filled with a lubricant. The lubricant stored in the curved storage part 36 can improve the lubrication effect to lower torque.

Figure 8:
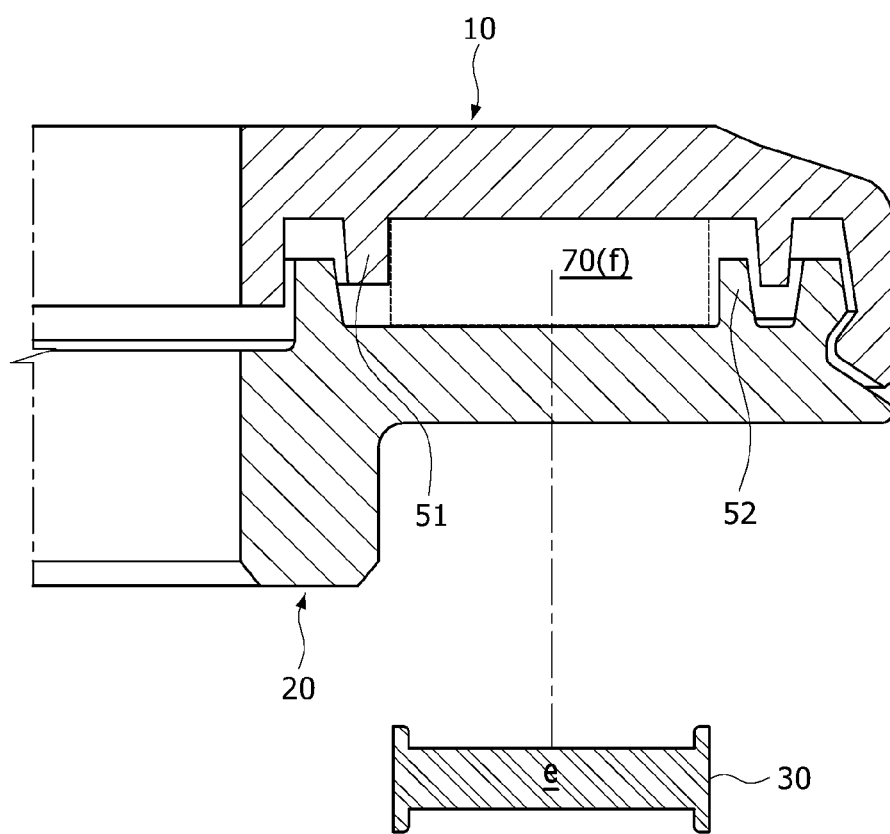
FIG. 8 is a diagram schematically illustrating an installation space in accordance with an embodiment of the present disclosure.

FIG. 8 is a diagram schematically illustrating an installation space in accordance with an embodiment of the present disclosure. Referring to FIG. 8, the rotation induction device 1 for a vehicle in accordance with the embodiment of the present disclosure may further include an installation space 70. The installation space 70 may be formed between the upper case 10 and the lower case 20, and formed as a ring-shaped space into which the center plate 30 is to be inserted.

More specifically, the installation space 70 may indicate a space formed between the upper guide part 51 and the lower guide part 52. That is, the installation space 70 may correspond to the ring-shaped space between the outer circumferential surface of the upper guide part 51 and the inner circumferential surface of the lower guide part 52.

The volume (e) of the center plate 30 may be set in the range of 50% to 98% of the volume (f) of the installation space 70. The volume (e) of the center plate 30 and the volume (f) of the installation space 70 may be defined as expressed by Equation 3 below.

$$0.5f \leq e \leq 0.98f \qquad \text{[Equation 3]}$$

The ratio regulation of the volume (e) of the center plate 30 may regulate a change in position by a horizontal load so as to prevent a lubricant leak due to a change in position or shock which is caused by a horizontal load of the center plate 30, which makes it possible to improve the durability and lubrication performance.

Figure 9:
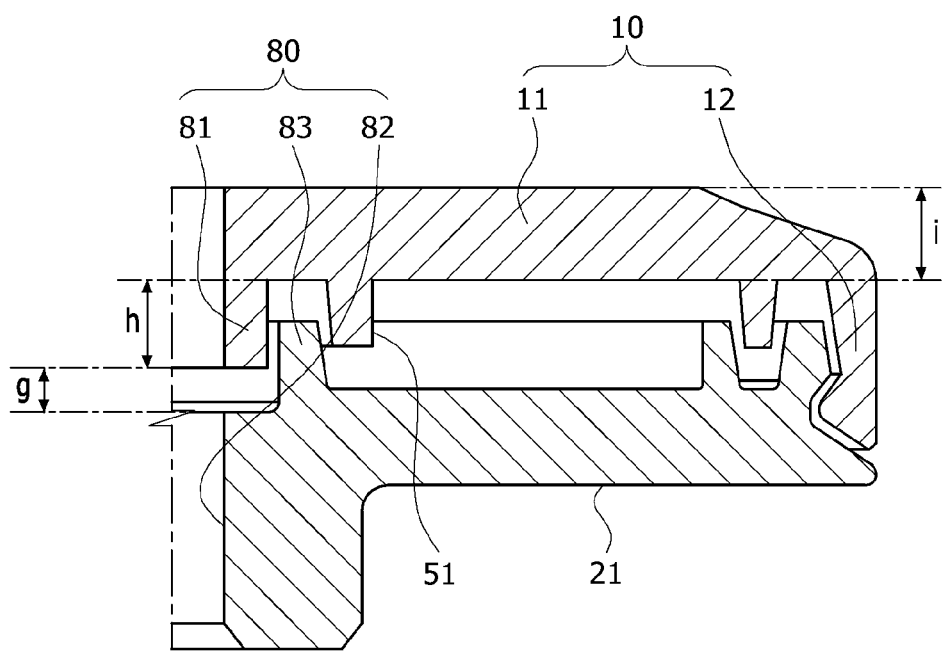
FIG. 9 is a diagram schematically illustrating an inflow prevention part in accordance with an embodiment of the present disclosure.

FIG. 9 is a diagram schematically illustrating an inflow prevention part in accordance with an embodiment of the present disclosure. Referring to FIG. 9, the rotation induction device 1 for a vehicle in accordance with the embodiment of the present disclosure may further include an inflow prevention part 80. The inflow prevention part 80 is formed on any one or more of the upper and lower cases 10 and 20, and serves to block the inflow of foreign matters through the piston rod 200. For example, the inflow prevention part 80 may block foreign matters from flowing into the gap between the upper case 10 and the piston rod 200 and the gap between the lower case 20 and the piston rod 200.

More specifically, the inflow prevention part 80 includes an upper prevention part 81, a lower prevention part 82 and an inner prevention part 83.

The upper prevention part 81 is extended downward from the inside of the upper case 10, and covers the piston rod 200. For example, the upper prevention part 81 may be integrated with the upper cover part 11, and extended downward from the inner circumferential surface of the upper cover part 11. The inner circumferential surface of the upper prevention part 81 may cover the piston rod 200. The bottom of the upper prevention part 81 may be located at a lower level than the bottom of the upper guide part 51.

The lower prevention part 82 is extended from the inside of the lower case 20 so as to cover the piston rod 200, and disposed under the upper prevention part 81. For example, the lower prevention part 82 may be integrated with the lower cover part 21, and formed in the lower cover part 21. The inner circumferential surface of the lower prevention part 82 may cover the piston rod 200. The lower prevention part 82 and the upper prevention part 81 may be disposed on a straight line. The top surface of the lower prevention part 82 may be located at a lower level than the top surface of the lower cover part 21.

The inner prevention part 83 is extended upward from the lower case 20, and disposed to face the upper prevention part 81. For example, the inner prevention part 83 may be integrated with the lower cover part 21, and inserted between the upper prevention part 81 and the upper guide part 51 so as to form a labyrinth structure. At this time, the top of the inner prevention part 83 may be located at a high level than the bottoms of the upper prevention part 81 and the upper guide part 51.

The distance (g) between the upper prevention part 81 and the lower prevention part 82 may be set in the range of 10% to 50% of a height (h) of the upper prevention part 81. The height (i) of the upper case 10 may be equal to or larger than the height (h) of the upper prevention part 81.

That is, the height (h) of the upper prevention part 81 may indicate the length of the upper prevention part 81 protruding from the bottom surface of the upper cover part 11, and the height (i) of the upper case 10 may indicate the thickness of the upper cover part 11. The heights (h) and (i) may be defined as expressed by Equation 4 below.

$$0.1h \leq g \leq 0.5h, h \leq i \quad \text{[Equation 4]}$$

The regulation of the distance (g) between the upper prevention part 81 and the lower prevention part 82 and the height (h) of the upper prevention part 81 may block the contact between the upper prevention part 81 and the lower prevention part 82 and thus prevent reduction in torque. Furthermore, the inflow of foreign matters may be blocked through the labyrinth structure, which makes it possible to protect the equipment. Furthermore, the regulation of the height (i) of the upper case 10 may block reduction in stiffness of the upper cover part 11.

In the rotation induction device 1 for a vehicle in accordance with the embodiment of the present disclosure, the position guide part 50 may be disposed inside and outside the center plate 30, thereby preventing a change in position of the center plate 30 by a load, and suppressing a lubricant leak.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A rotation induction device for a vehicle, comprising:
an upper case having a piston rod disposed therethrough;
a lower case disposed adjacent to the upper case and having the piston rod disposed therethrough;
a center plate disposed between the upper case and the lower case such that the piston rod passes through the center plate, and configured to induce rotation of one or both of the upper case and the lower case; and
a position guide part formed on one or both of the upper case and the lower case, and configured to guide a position of the center plate; and
a friction restraint part comprising an upper restraint part formed on either the upper case or an upper surface of the center plate and including upper curved surfaces that bring the upper case into contact with the center plate and a lower restraint part formed on either the lower case or a lower surface of the center plate and including lower curved surfaces that bring the lower case into contact with the center plate, wherein
the upper case comprises an upper blocking part disposed at a periphery thereof to block an inflow of foreign matters, the upper blocking part comprises an upper blocking hook part extended toward the lower case, and the upper blocking hook part comprises an upper inclined surface formed thereon, the upper inclined surface extending downward and away from the center plate, and
the lower case comprises a lower blocking part disposed at a periphery thereof to block an inflow of foreign matters, the lower blocking part comprises a lower blocking dropping part extended toward an end of the upper blocking hook part so as to drop foreign matters, and the lower blocking dropping part comprises a lower inclined surface corresponding to the upper inclined surface, the lower inclined surface extending downward and away from the center plate.

2. The rotation induction device of claim 1, wherein the upper case comprises:
an upper cover part configured to cover a first surface of the center plate, the upper cover part defining an upper hole through which the piston rod passes, and
the upper blocking part is disposed at a periphery of the upper cover part.

3. The rotation induction device of claim 2, wherein the lower case comprises:
a lower cover part configured to cover a second surface of the center plate, the lower cover part defining a lower hole through which the piston rod passes, and
the lower blocking part is disposed at a periphery of the lower cover part.

4. The rotation induction device of claim 3, wherein the upper blocking part comprises:
an upper blocking protrusion part protruding from the upper cover part toward the lower case, and disposed to face the upper blocking hook part across a space.

5. The rotation induction device of claim 4, wherein the lower blocking part comprises:
   a lower blocking locking part disposed along the periphery of the lower cover part, and defining a groove into which the upper blocking hook part is configured to be locked and fixed; and
   a lower blocking protrusion part protruding from the periphery of the lower cover part toward the upper case, and disposed in the space between the upper blocking hook part and the upper blocking protrusion part.

6. The rotation induction device of claim 5, wherein the upper inclined surface is disposed on an outer end of the upper blocking hook part.

7. The rotation induction device of claim 5, wherein the lower blocking protrusion part overlaps with the upper blocking protrusion part.

8. The rotation induction device of claim 1, wherein the position guide part comprises:
   an upper guide part protruding from the upper case toward the lower case to support an inner circumferential surface of the center plate; and
   a lower guide part protruding from the lower case toward the upper case to support an outer circumferential surface of the center plate.

9. The rotation induction device of claim 8, wherein the upper guide part and the lower guide part each have an annular shape.

10. The rotation induction device of claim 1, wherein one or more of the upper case, the lower case, and the center plate are composed of a synthetic resin material.

11. The rotation induction device of claim 1, further comprising:
   a first lubricant retention part protruding from the lower case toward the upper case and covering an inner peripheral surface of the center plate to prevent lubricant from overflowing to an inside of the center plate; and
   a second lubricant retention part protruding from the lower case toward the upper case and covering an outer peripheral surface of the center plate to prevent lubricant from overflowing to the inside of the center plate.

12. The rotation induction device of claim 11, wherein a height of each of the first lubricant retention part and the second lubricant retention part is in the range of 50% to 60% of a height of the center plate.

13. The rotation induction device of claim 1, wherein the upper restraint part is formed on the upper case and the upper curved surfaces extend downward to contact the center plate, the lower restraint part is formed on the lower case and the lower curved surfaces extend upward to contact the center plate.

14. The rotation induction device of claim 1, wherein the upper restraint part is formed on the upper surface of the center plate and the upper curved surfaces extend upward to contact the upper case, the lower restraint part is formed on the lower surface of the center plate and the lower curved surfaces extend downward to contact the lower case.

* * * * *